Sept. 26, 1961  H. PAPST  3,002,118
ROTATING FIELD MOTOR
Filed Sept. 18, 1956  3 Sheets-Sheet 1

Inventor
Hermann Papst
By Michael S. Striker
agt.

Sept. 26, 1961            H. PAPST            3,002,118
ROTATING FIELD MOTOR
Filed Sept. 18, 1956            3 Sheets-Sheet 2
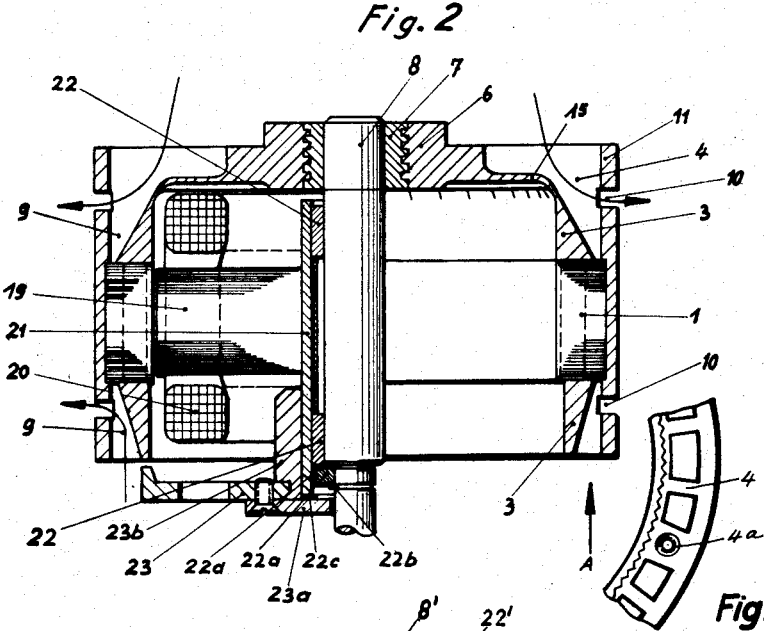
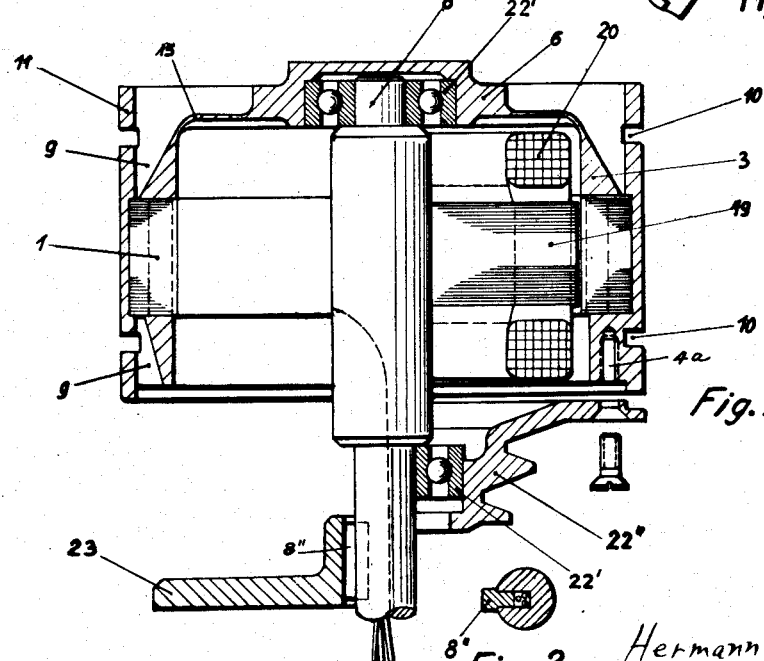

Sept. 26, 1961 H. PAPST 3,002,118
ROTATING FIELD MOTOR
Filed Sept. 18, 1956 3 Sheets-Sheet 3
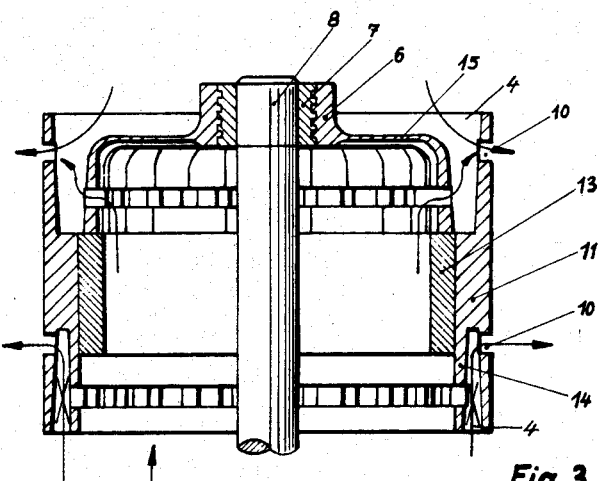
Fig. 3
Fig. 3a
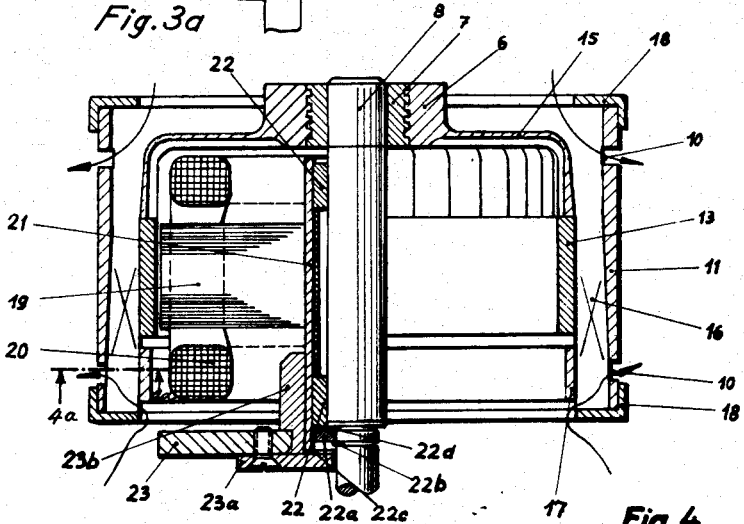
Fig. 4
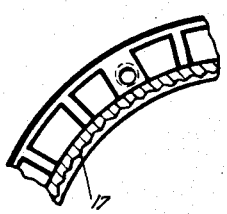
Fig. 4a
Inventor
Herman Papst
By Michael S. Striker
Agt.

United States Patent Office 3,002,118
Patented Sept. 26, 1961

3,002,118
ROTATING FIELD MOTOR
Hermann Papst, Pavillonweg 3, St. Georgen,
Black Forest, Germany
Filed Sept. 18, 1956, Ser. No. 610,508
Claims priority, application Germany Oct. 24, 1955
1 Claim. (Cl. 310—61)

The present invention relates to electric motors, and more particularly to electric motors of the rotating field type.

In particular, the present invention relates to electric motors of this type wherein the stator is located in the interior of the rotor. This rotor forms a major part of the exterior housing of the motor and at the same time rotates.

One of the objects of the present invention is to provide a motor of this type which is of extremely simple construction and at the same time of relatively high efficiency.

Another object of the present invention is to provide a motor of this type with structure capable of efficiently cooling the motor.

A further object of the present invention is to arrange the exterior rotating parts of the motor in such a way that they will not be capable of injuring the fingers of an attendant, for example.

An additional object of the present invention is to provide a motor of the above type which can provide a greater output of power than similar motors of conventional construction and corresponding size and which also has a very high torque particularly at low speeds of rotation.

Also, it is an object of the present invention to provide a motor of the above type which can conveniently have such elements as fan blades or pulleys joined thereto.

With the above objects in view, the present invention mainly consists of a rotating field motor which includes an inner stator and an outer rotor surrounding the stator. This rotor includes an inner annular portion of ferromagnetic material closely surrounding the stator and additional annular portions of non-ferromagnetic material as well as a plurality of cooling fins also of non-ferromagnetic material. The additional annular portions as well as the cooling fins and the inner annular portion of ferromagnetic material are all joined together and form an electrical and mechanical unit.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the acocmpanying drawings, in which:

FIG. 2 is a sectional elevational view of a different construction of a rotating field motor according to the present invention, FIG. 2 also showing the stator and support structure only at the left half of FIG. 2;

FIG. 2a is a sectional elevational view of still another embodiment of a rotating field motor according to the present invention, FIG. 2a showing the stator at the right half of FIG. 2a and showing the support structure for the motor at the left half of FIG. 2a;

FIG. 2b is a fragmentary bottom plan view of the outer rotor of the motor shown in FIG. 2, FIG. 2b being taken in the direction of arrow A of FIG. 2;

FIG. 2c is a fragmentary sectional view of the stationary shaft of FIG. 2a which supports the rotor for rotation as well as of a wedge member used for mounting the stationary shaft on its support;

FIG. 3 is a sectional elevational view of still another embodiment of a motor according to the present invention;

FIG. 3a is a fragmentary view of a fan blade adapted to be joined to the rotor of FIG. 3 for rotation therewith;

FIG. 4 is a sectional elevational view of still another embodiment of a motor according to the present invention, the stator and support structure for the motor being shown only at the left half of FIG. 4; and FIG. 4a is a fragmentary view taken along line 4a—4a of FIG. 4 in the direction of the arrows.

Figure 1:
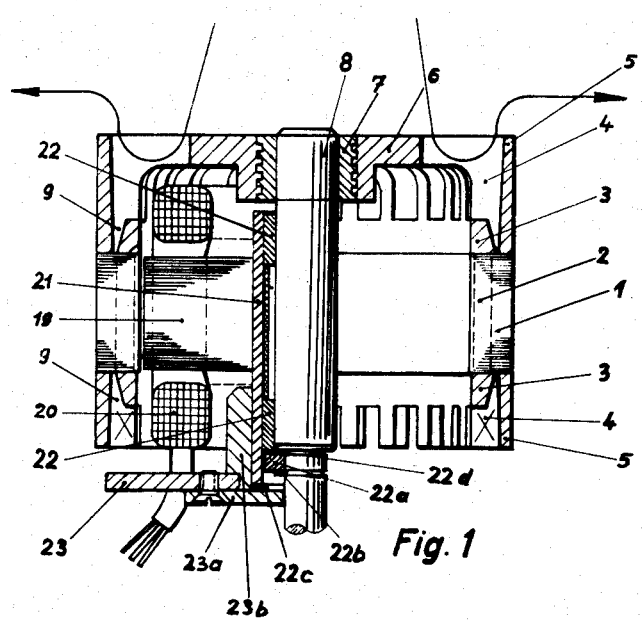
FIG. 1 is a sectional elevational view of a motor according to the present invention, only the left half of FIG. 1 showing the stator and the support structure for the motor.

Referring to FIG. 1 of the drawings, it will be seen that the motor illustrated therein includes a stationary support plate 23 mounted on any suitable carrying structure. An additional plate 23a is joined as by screws or the like to the plate 23. This plate 23 is formed at a central portion with an opening passing therethrough, and the plate 23a is formed at a central portion thereof with a smaller opening which is axially aligned with the opening in the center of the plate 23, so that the plate 23a extends inwardly beyond the inner annular edge of the plate 23. A sleeve 23b is fixed to the inner periphery of the plate 23 and extends upwardly therefrom, and a longer sleeve 21 extends into and is joined to the sleeve 23b, the bottom end of the sleeve 21 engaging the upper face of the plate 23a. A pair of bearings 22 are fixed in the interior of the sleeve 21, and these bearings serve to guide the shaft 8 for rotation about its axis. At its lower portion, as viewed in FIG. 1, the shaft 8 is of reduced diameter, and a ring 22a of plastic or the like is engaged at its opposite faces by rings 22b and 22d of suitable bearing material, the upper ring 22d engaging the bottom face of the lower bearing 22 and the bottom ring 22b supporting the ring 22a. In addition a ring 22c of bearing material fills the gap between the plate 23a and the sleeve 21. In this way the shaft 8 is guided for rotation about its axis with substantially no play, and furthermore, as is evident from FIG. 1, axial play in the shaft 8 also is substantially eliminated. This latter elimination of axial play is brought about in particular by the snap ring 22b located in an annular groove of the reduced portion of the shaft 8 and engaging the ring 22a which fills the gap between the bearing sleeve 21 and the reduced portion of the shaft 8.

At its upper end the shaft 8 has a press fit in a ring 7 made of steel, for example, and having an outer irregular surface, as shown in FIG. 1.

The sleeve 21 carries the stator which includes the laminations 19 and the windings 20, the leads for these windings passing through a suitable opening in the plate 23, as indicated in FIG. 1.

The rotor of the motor shown in FIG. 1 includes a ferromagnetic portion 1 which is composed of a plurality of annular laminations forming a stack of such laminations, these laminations being formed with aligned openings through which bars 2 respectively pass. The bars 2 are joined integrally with a pair of inner rings 3 of non-ferromagnetic material, and the end laminations are adjoined to a pair of outer rings 5 also of non-ferromagnetic material. These inner rings 3 and outer rings 5 are in turn joined integrally with a plurality of cooling fins 4 which extend radially inwardly from the outer rings 5 and which are distributed in a substantially uniform manner about the axis of the rotor. At their inner ends the cooling fins 4 are joined integrally with a central hub 6 which is located at one end of the rotor and which is in turn affixed to the ring 7.

The non-ferromagnetic elements 3—6 may be made of any suitable light metals such as aluminum or aluminum alloys. This portion of the rotor is die cast, for example, all at one time in a suitable mold. This mold is provided with a plurality of projections which define the spaces between the cooling fins 4, and when the mold is set up for use the ends of these projections of the mold bear against the laminations which form the ferromagnetic portion 1 so as to hold these laminations together during the molding process. The ring 7 is also placed in the proper position in the mold, and then the metal such as aluminum, for example, is poured so as to fill the spaces between the mold projections which engage the laminations and so as to pour into the recesses in the outer irregular surface of the ring 7. In this way the cooling fins 4 as well as the inner and outer annular portions 3 and 5 and the hub 6 are all formed with one pouring operation, and they are all integral with each other and securely joined to the laminations which form the ferromagnetic portion 1. The molds serve the additional purpose of holding these laminations together during the molding process, and the resulting structure of the rotor forms both a mechanical and an electrical unit. If desired the outer annular portions 5 need not be molded together with the elements 3, 4 and 6, and these outer annular portions 5 may be provided after the formation of elements 3, 4, and 6.

It will be noted from FIG. 1 that the rings 3 and 5 are separated from each other and that end portions 9 of the fins 4 are located between these rings. It is the parts of the mold which define the spaces between these end portions 9 which engage the stack of laminations and hold them together during the molding process.

During the rotation of the rotor, air moves in the directions of the arrows shown at the upper portion of FIG. 1 to provide efficient cooling of the motor, air moving in a similar direction at the lower portion of the rotor. Also, it should be noted that the plurality of fins 4 are angularly spaced from each other by a distance which is too small to permit the fingers of an attendant to get into the spaces between the fins 4, so that in this way injury to an attendant is avoided.

The embodiment of the invention which is shown in FIG. 2 is substantially identical with that of FIG. 1. However, in the embodiment of FIG. 2 instead of a pair of separate outer rings 5 of non-ferromagnetic material, a single continuous outer cylindrical wall 11 is provided, this wall covering the exterior of the stack of laminations 1, so that this arrangement provides a structure similar to a Gramme ring winding. Furthermore, it will be noted that the inner edges of the fins 4 are joined to each other by an annular wall 15 which is poured simultaneously with the remainder of the non-magnetic elements, and thus this wall 15 which extends from the upper inner ring 3 to the hub 6 along the inner edges of the fins 4 serves to close off the interior of the rotor at its upper end. If necessary, openings can be punched or otherwise formed through the wall 15. Also, it will be noted that the outer wall 11 is formed with a plurality of cutouts 10 which provide a passage for the air, as indicated by the arrows shown in FIG. 2.

As is shown in FIG. 2b the inner periphery of the lower ring 3 is serrated or otherwise roughened so as to improve the cooling of the rotor, and furthermore suitable threaded apertures 4a may be provided at certain fins 4 which are thicker than the others so that any desired elements may be connected to the rotor for rotation therewith.

FIG. 2a shows such an arrangement. Thus, in FIG. 2a a bottom cover closes off the rotor, and this cover is joined to the rotor by screws which extend through openings at the periphery of the cover into the threaded openings 4a in order to fix such a cover to the rotor. This cover is formed with a pulley 22″, so that the rotor may be used for driving a belt. With the embodiment of FIG. 2a, the structure is carried by a flanged plate 23 into which the bottom end of the shaft 8′ is wedged, so that the shaft 8′ has a press fit in elements 23, the shaft 8′ being formed with a suitable groove which receives a wedge member 8″ which becomes wedged against the inner surface of the member 23, as is evident from FIG. 2a and FIG. 2c. It will be noted that the shaft 8 is formed with an axially extending groove through which the stator leads may pass, as is shown in FIGS. 2c and 2a. Furthermore, with the embodiment of FIG. 2a ball bearings 22′ are carried by the shaft 8′ and serve to rotatably support the rotor.

With the above described embodiments of the invention the ferromagnetic portion which surrounds the stator is in the form of a stack of laminations. With the embodiment of FIG. 3 a solid annular body 13 of ferromagnetic material surrounds the stator, and this body 13 may have a press fit in the outer annular non-magnetic cylindrical wall 11 of the rotor. Also, this wall 11 may have a shrink fit on the body 13. In order to improve the electrical properties of the motor the outer surface of the body 13 may be coated with a suitable contact metal. Thus, the body 13 may be tin-plated for this purpose.

It will furthermore be noted that with the embodiment of FIG. 3 the wall 15 is formed with an annular groove extending up to the cooling fins 4 so that air may flow from the interior of the rotor out through the wall 15 and through the spaces between the fins 4 and finally out through the openings 10. In the same way, an inner annular portion 14 of the cylindrical wall 11 extends along the inner edges of the lower cooling fins 4, and this wall 14 is also formed with an annular groove extending up to the cooling fins to provide an additional passage of air from the interior of the rotor out to the exterior thereof.

The fins 4 at the bottom end of the rotor of FIG. 3 may be provided with threaded axial bores into which screws may extend for connecting to the rotor elements such as a fan blade 50 shown fragmentarily in FIG. 3a, this fan blade being moved upwardly and to the left into proper relationship with the rotor, as indicated by the arrows in FIG. 3a. A plurality of such fan blades may thus be connected to the rotor for rotation therewith so that in this way the motor of FIG. 3, or in fact any of the other motors of the invention, may be used for a fan.

The embodiment of FIG. 4 distinguishes over that of FIG. 3 by having elongated cooling fins 16 which extend axially along the entire length of the rotor. Thus, a very good cooling action is provided with this motor. A solid ring 13 of ferromagnetic material is pressed into the interior of the rotor, and with the structure of FIG. 4 the ring 13 is in direct engagement with the inner edges of the fins 16. Because it is necessary to place the ring 13 in the interior of the rotor with a press fit, for example, after the non-ferromagnetic elements of the rotor are formed, a separate ring 17 is located in the rotor and may also have a press fit with the interior edges of the fins 16. This ring 17 substantially reduces the noise of operation of the motor, so that the motor of FIG. 4 is suitable for uses where reduction of noise is highly desirable. Furthermore, with the embodiment of FIG. 4 rings 18 of highly permeable metal are provided at the outer peripheries of the rotor at its opposite end, these rings being fixed to the rotor for rotation therewith, and the use of such rings greatly reduces the stray field loss.

FIG. 4a shows the structure of FIG. 4 in a sectional fragmentary view and illustrates how the ring 17 can be provided with an irregular inner surface to improve the cooling of the motor. Moreover, FIG. 4a shows how one of the fins 16 is thicker than the others and provided with a threaded aperture which extends downwardly through the ring 18 so that any suitable elements may be fixed to the rotor for rotation therewith.

It should be noted that with all embodiments of the invention, not only are the fins radially spaced from each other by a distance too small to receive any of the fingers of an attendant, but in addition the openings 10 are too small for this purpose, so that the possibility of injury is very greatly reduced. Also, it should be noted that the cooling fins act as fan blades as well as fins for cooling the rotor.

With the embodiment of FIG. 3 the inner massive ring 13 forms a rotating body of iron having eddy currents therein and providing a skin effect when the motor is started. Such motors operate with a higher slip than other motors of this type, but they are capable of producing a greater torque and require only a small amount of additional current when they are stationary. They can be strongly braked and still rotate at low speeds. The tin plating of the body 13 of FIG. 3 at its outer surface where it engages the outer wall 11 provides a metallic contact, so that a short circuiting similar to that of FIG. 2 is obtained.

The ring 13 shown in FIG. 4 may be made, for example, of a material having strong hysteresis properties, such as chrome magnetic steel. By tin plating this ring 13 and pressing it into its operative position, this body 13 has an increased conductivity of eddy currents when the motor is started, so that the torque is increased in this way.

With all of the above described embodiments of the invention a unitary outer rotating housing is provided having very good cooling action, and the motors of the invention can be loaded to 50-100% greater extent than known similar motors of corresponding size. Furthermore, the danger of injury to an operator is avoided, and the noise of operation is lowered.

It will be understood that each of the elements described above, or two or more together, may also find a useful application in other types of motors differing from the types described above.

While the invention has been illustrated and described as embodied in rotating field motors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptation should and are intended to be comprehended within the meaning and range of equivalence of the following claim.

What is claimed as new and desired to be secured by Letters Patent is:

A rotating field motor comprising an inner stator; means for supplying electrical current to said stator; and an outer, integral, cup-shaped, non-magnetic, metallic rotor housing having a circumferential wall defining a cavity about the stator; an axially central annular magnetic portion in said circumferential wall and forming a mechanical and electrical unit with said housing; the housing having annular recesses in its axial ends to define cooling spaces adjacent said magnetic portion, a plurality of radial cooling fins in said spaces and integral with said housing and the cooling spaces being open in a radial and an axially outward direction.

References Cited in the file of this patent

UNITED STATES PATENTS

| | | |
|---|---|---|
| 765,078 | Jigouzo | July 12, 1904 |
| 1,652,492 | Naul | Dec. 13, 1927 |
| 1,725,740 | Schulte | Aug. 20, 1929 |
| 2,810,084 | Sprando | Oct. 15, 1957 |

FOREIGN PATENTS

| | | |
|---|---|---|
| 365,610 | Germany | Dec. 18, 1922 |
| 375,101 | Italy | Sept. 22, 1939 |
| 642,616 | France | May 6, 1928 |
| 973,951 | France | Sept. 20, 1950 |